United States Patent [19]
Masone et al.

[11] Patent Number: 6,121,885
[45] Date of Patent: Sep. 19, 2000

[54] COMBINATION SMOKE DETECTOR AND SEVERE WEATHER WARNING DEVICE

[76] Inventors: Reagan Masone; Tony Masone, both of 4275 Alyssa La., W. Melbourne, Fla. 32904; David Eddins, 1540 S. Banana River Dr., Merritt Island, Fla. 32935

[21] Appl. No.: 09/286,646

[22] Filed: Apr. 6, 1999

Related U.S. Application Data

[60] Provisional application No. 60/081,320, Apr. 10, 1998.

[51] Int. Cl.$^7$ .................................................. G08B 17/10
[52] U.S. Cl. ................... 340/628; 340/286.05; 340/287; 340/521; 340/522; 340/632; 379/43; 379/48
[58] Field of Search .................................. 340/628, 539, 340/601, 521, 522, 632, 573.5, 286.05, 287, 291; 379/48, 110.01, 43

[56] References Cited

U.S. PATENT DOCUMENTS

| | | | |
|---|---|---|---|
| D. 360,373 | 7/1995 | Tice et al. | D10/106 |
| D. 361,732 | 8/1995 | Fischette et al. | D10/106 |
| D. 382,217 | 8/1997 | Akiyama et al. | D10/106 |
| 3,753,117 | 8/1973 | Downing et al. | 73/170.24 |
| 4,365,237 | 12/1982 | Knight | 340/521 |
| 4,949,077 | 8/1990 | Mbuthia | 340/628 |
| 5,446,445 | 8/1995 | Bloomfield et al. | 340/522 |
| 5,500,639 | 3/1996 | Walley et al. | 340/539 |
| 5,512,874 | 4/1996 | Poston | 340/426 |
| 5,587,705 | 12/1996 | Morris | 340/628 |
| 5,774,038 | 6/1998 | Welch et al. | 340/286.05 |
| 5,805,100 | 9/1998 | Becker et al. | 342/26 |
| 5,815,075 | 9/1998 | Lewiner et al. | 340/506 |
| 5,949,851 | 9/1999 | Mahaffey | 379/48 |

FOREIGN PATENT DOCUMENTS

| | | |
|---|---|---|
| 3332245 | 3/1985 | Germany . |
| 59-178875 | 11/1984 | Japan . |
| 1-93986 | 12/1989 | Japan . |
| 2280295 | 1/1995 | United Kingdom . |

*Primary Examiner*—Edward Lefkowitz
*Assistant Examiner*—Davetta W. Goins
*Attorney, Agent, or Firm*—Richard C. Litman

[57] ABSTRACT

A combination smoke detector and severe weather warning device is housed in a common housing, such as a housing resembling that for a conventional smoke detector. The combination device includes a smoke detector and alarm for sensing smoke and/or fire in the immediate area and transmitting an audible alarm, and also includes a VHF FM radio for receiving severe weather broadcasts and alerts from the National Oceanic And Atmospheric Administration (NOAA), from a remotely located transmitter. Preferably different audible alarms are provided for the smoke detector and for severe weather warnings from the radio, in order that persons may distinguish the type of alarm issued by the device. The combination device is preferably powered by an electrical power supply installed within the building structure within which the device is installed, but may be powered by self contained electrical batteries. Preferably, a battery or batteries is/are provided as an alternative source of electrical power in the event of a power outage of the main electrical power supply. The combination device is of great value in areas where severe thunderstorms and tornadoes occur, and serves to provide a warning of such phenomenon to persons who might not otherwise receive warning of such, e. g., when they are asleep and/or other broadcast receivers (radio, television) are turned off.

8 Claims, 1 Drawing Sheet

COMBINATION SMOKE DETECTOR AND SEVERE WEATHER WARNING DEVICE

REFERENCE TO RELATED PATENT APPLICATION

This application claims the benefit of U. S. Provisional Patent Application Ser. No. 60/081,320, filed on Apr. 10, 1998.

BACKGROUND OF THE INVENTION

1. Field of the Invention

The present invention relates generally to electronic warning devices, and more specifically to a combination smoke detector and severe weather warning device. The device houses a smoke detector and FM radio which receives area specific severe weather alerts and broadcasts from the National Oceanic and Atmospheric Administration, according to the area of concern.

2. Description of the Related Art

Most, if not all, areas of the country have building codes requiring that smoke detectors or smoke alarms be installed in almost all structures, at least of new construction. The installation of such devices has proven to be a life saving measure, as the warning provided can often alert persons within the structure, to evacuate the structure in a timely manner.

Severe weather, particularly localized and rapidly forming weather such as tornadoes, also takes a toll of life in many areas. Accordingly, the National Oceanic and Atmospheric Administration (NOAA) has implemented an FM radio network across the U. S. to provide severe weather warnings on a region or area specific basis.

In 1994, the system was improved by implementing "Specific Area Message Encoding" (SAME), in which each broadcast is preceded by a "Federal Information Processing System" (FIPS) code. Weather radios with this system include means for setting the receiver to be activated only by a specific code. Thus, a severe weather warning broadcast intended to cover only a certain area (e. g., a county), will be preceded by a "FIPS" code only for that county. Only radios which have been set to be activated by that specific code, will be activated by the broadcast to produce a suitable alarm and/or voice broadcast of the severe weather warning.

However, relatively few people have purchased, or have access to, such weather warning radios, for various reasons. Yet, severe weather which hits an area at night can be tragic in terms of loss of life. The provision and use of such radios, particularly those using the "SAME" system of regionally coded messages, could do much to save lives in such situations.

Accordingly, a need will be seen for an emergency warning device which combines the features of a smoke alarm or detector and severe weather warning radio. The device provides a single, central warning source for sudden emergency situations, providing an audible alarm when smoke is detected and further providing a different audible alarm in the event of severe weather in the area. The device may be powered by standard household electrical power, and may include backup battery power.

A discussion of the related art of which the present inventor is aware, and its differences and distinctions from the present invention, is provided below.

U.S. Pat. No. 3,753,117 issued on Aug. 14, 1973 to George C. Downing et al., titled "Severe Weather Warning Device," describes an electronic device for detecting electromagnetic energy from an electrical storm. Certain parameters are provided which are consistent with a base level of electromagnetic activity associated with a severe thunderstorm which has developed one or more tornadoes, with the device providing an alarm if those parameters are exceeded. Downing et al. describe several advantages to their device, e. g., providing a warning for sleeping persons, etc., which advantages are also provided by the severe weather warning radio incorporated with the present combination invention. However, the Downing et al. device is not tuned to receive a specific frequency, nor to detect modulations of any specific frequency to provide a voice broadcast. Moreover, the Downing et al. device does not provide any discrimination of an area specific code, as provided by the weather warning radio of the present combination invention. Also, while Downing et al. recognize the importance of providing a loud audible warning of hazardous conditions to persons in a structure, they do not recognize the advantages of incorporating a weather warning device in combination with a smoke detector and alarm in a single unit, as provided by the present invention.

U.S. Pat. No. 4,949,077 issued on Aug. 14, 1990 to David C. Mbuthia, titled "Portable Unit With Smoke Alarm, Clock Radio, Compass, Retractable Table, And Lamp," describes a device incorporating (among other things) a smoke detector and radio. The device is of particular value to a traveler staying in a hotel or motel room, and offers several desirable features in a single package. However, Mbuthia makes no mention of any specific severe weather alerting means for the radio incorporated with his device. In the event that the radio were shut off, as is likely during the night, any standard broadcast of a severe weather warning would go undetected by the radio of the Mbuthia combination, and would not activate to awaken a sleeping person. The severe weather warning radio incorporated with the smoke detector of the present invention, provides a relatively loud audible alarm when it detects the area specific code to which it has been set, thus awakening a sleeping person and alerting him or her to the potential hazard.

U.S. Pat. No. 5,500,639 issued on Mar. 19, 1996 to Ian M. Walley, titled "Satellite Unit Identification System," describes an alarm system incorporating a series of satellite detectors and a single central alarm unit, somewhat the opposite of the severe weather alert system used in the present invention. In the Walley system, each detector is also a transmitter which sends a signal back to the central alarm unit, along with a code identifying the specific receiver. The central unit disregards any signal rot including the proper code, and remains inactive. Walley does not provide for the reception of a severe weather warning broadcast signal from a central source with his device, nor does he provide for a single, stand alone smoke detection means with his device, as provided by the present combination invention.

U.S. Pat. No. 5,587,705 issued on Dec. 24, 1996 to Gary J. Morris, titled "Multiple Alert Smoke Detector," describes a smoke detector network in which each of the detectors includes both a radio transmitter and a receiver. If any one of the detectors is activated, it transmits a radio signal to all of the other detectors in the network to activate those detectors as well. The present device does not include any form of radio transmission means, but provides only a receiver for receiving severe weather warning broadcasts, and alarm means for alerting persons when a severe weather broadcast has been received or when smoke has been detected by the smoke detector portion of the device.

U.S. Pat. No. D-360,372 issued on Jul. 18, 1995 to Lee D. Tice et al., titled "Housing For A Smoke Detector," illustrates a design for an exterior shell or housing for such a device. No indication of any radio receiving means is provided in the Tice et al. disclosure.

U.S. Pat. No. D-361,732 issued on Aug. 29, 1995 to Robert G. Fischette et al., titled "Smoke Detector Housing," illustrates a design for the exterior of such a device. Again, no radio receiving means is disclosed.

U.S. Pat. No. D-382,217 issued on Aug. 12, 1997 to Nobuyuki Akiyama et al., titled "Fire Detector," illustrates a design for a smoke or fire detector shell or housing. As in the other design patents discussed above, no radio receiving means is apparent in the Akiyama et al. design patent.

Japanese Patent Publication No. 59-178,875 published on Oct. 11, 1984 describes (according to the English abstract) a system for receiving a signal from a fire detector and converting it to an audible and visual signal for play from a conventional television set. No means of receiving any severe weather warning, either audible or visual, is described in the English abstract.

German Patent Publication No. 3,332,245 published on Mar. 21, 1985 describes (according to the English abstract) a television set incorporating an integral smoke detector, alarm, and automatic closure for the set cabinet. The device is intended only to close the cabinet in the event of smoke or fire within the television cabinet, and provides no alarm means for any external condition, either smoke, fire, or severe weather.

Japanese Patent Publication No. 1-93986 published on Apr. 12, 1989 describes (according to the English abstract) a smoke detector having an interchangeable escutcheon or trim plate removably installable between the detector portion and the permanently installed base. No means is indicated for receiving any form of severe weather warning from a remote source in combination with the smoke alarm, as provided by the present invention.

British Patent Publication No. 2,280,295 published on Jan. 25, 1995, titled "Portable Smoke Detector," describes a detector including means for connecting to other detectors. The connection means is a receptacle in the case, providing only for hard wired communication between units. No radio frequency signal receiver for receiving severe weather or any other signals, is disclosed.

Finally, page 40 of the 1995 Radio Shack (tm) catalog describes two different models of their "Weatheradio" (tm). Each is a portable unit capable of receiving several different frequencies which are dedicated to transmittal of weather information by the National Oceanic and Atmospheric Administration (NOAA). At least one provides an alarm in the event of severe weather. However, no means of detecting smoke or fire, and/or providing an alarm or warning for such, is provided by the Radio Shack radios.

None of the above inventions and patents, taken either singly or in combination, is seen to describe the instant invention as claimed.

SUMMARY OF THE INVENTION

The present invention comprises a combination smoke detector and severe weather warning device, which is preferably permanently installed in a home or other structure. The combination device is housed in a common housing which may have the appearance of a conventional smoke detector, but includes the electronic circuitry for a radio receiver for receiving severe weather broadcasts and alarms over any of the standard VHF FM frequencies used by the National Oceanic and Atmospheric Administration (NOAA) for broadcasting such weather information. The device preferably utilizes electrical energy from the conventional electrical supply for the structure, but also preferably includes backup electrical battery power in the event that the electrical power is interrupted.

Accordingly, it is a principal object of the invention to provide an improved combination smoke detector and severe weather warning device.

It is another object of the invention to provide an improved smoke detector and severe weather warning device comprising a smoke detector and alarm for detecting smoke or fire in the immediate area of the detector, and further including a VHF FM radio for receiving remotely broadcast signals from transmitting means dedicated to the transmission of severe weather information and warnings.

It is a further object of the invention to provide an improved smoke detector and severe weather warning device which provides different audible alarms for smoke or fire detection and for receipt of a severe weather warning.

An additional object of the invention is to provide an improved smoke detector and severe weather warning device which includes a housing configuration similar to that of a conventional smoke detector.

Still another object of the invention is to provide an improved smoke detector and severe weather warning device which receives primary electrical power from a conventional electrical power source installed in the structure in which the device is installed, but which also includes an electrical battery for providing electrical power in the event that the primary electrical power is interrupted.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

The single drawing FIGURE is a block diagram of the standard and optional componentry of the present combination smoke detector and severe weather warning device.

Similar reference characters denote corresponding features consistently throughout the attached drawing.

DETAILED DESCRIPTION OF THE PREFERRED EMBODIMENT

Figure 1:
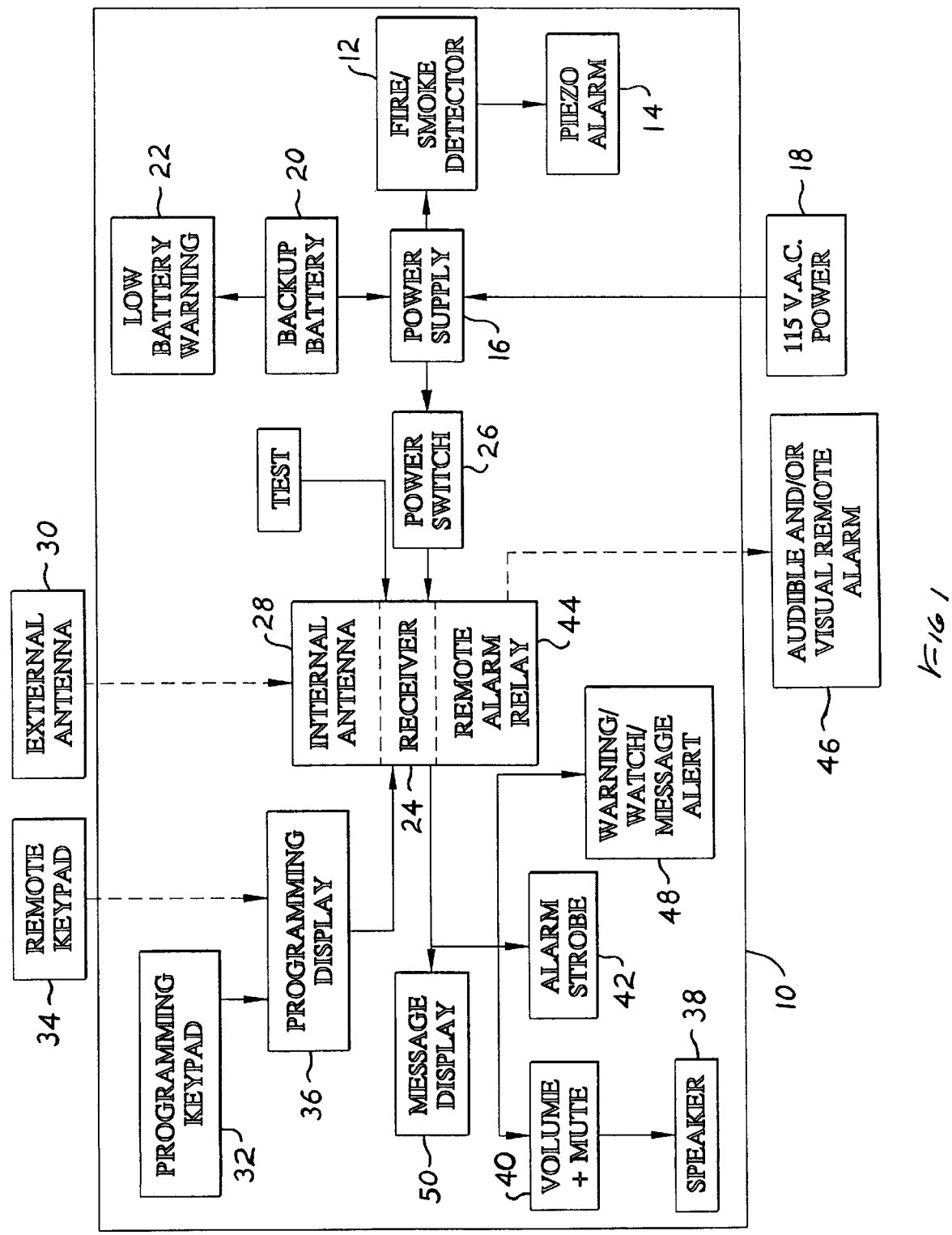

The present invention comprises a combination smoke detector and severe weather warning device, with all internal components being contained within a common housing. The single drawing FIGURE provides a block diagram of the basic and optional componentry of the present invention, including the common housing 10. It will be seen that the housing 10 may have any appearance or configuration as desired, so long as appropriate conventional apertures, openings, and/or passages are provided for access to such internal components as function controls, battery access for replacement, connections for external or remote components, etc. as desired.

The housing 10 includes a smoke and/or fire detector 12, which activates an alarm 14 when smoke and/or fire is detected. The detector 12 may be an ionized particle detector for detecting smoke, a heat sensing device serving as a fire detector, or a combination of smoke and fire detecting instruments or devices, as desired. The alarm 14 is preferably an economical piezoelectric unit serving to emit a single audible tone. However, the detector 12 may also activate other types of alarms, such as a visual alarm (strobe or other light, etc.) as desired.

The smoke and/or fire detector 12 receives continuous electrical power from a power supply 16, also enclosed within the housing 10. The power supply 16 in turn receives electrical power from a conventional external electrical power source 18, which provides nominal 115 volt alternating electrical current for the power supply 16, which reduces the voltage and rectifies the current to provide a relatively lower voltage direct current supply. An alternative power supply comprising a backup electrical cell or battery 20 is also provided, with the system automatically switching from the external power source 18 to the backup battery 20 in the event of an external power interruption. A low battery power warning means 22, e. g., an intermittent audible and/or visual warning, may be provided to alert a user that the backup battery 20 is in need of replacement. It will be seen that a rechargeable electrical cell or battery may be provided, with additional circuitry provided for maintaining the electrical charge of the battery so long as external electrical power is supplied.

The power supply 16 also provides electrical power of proper voltage and polarity to a radio receiver 24 (an on/off switch 26 may be provided between the power supply 16 and receiver 24, if desired). The receiver 24 is an FM device receiving a selected one of several VHF frequencies used for transmitting severe weather warnings and other weather information by NOAA (National Oceanic and Atmospheric Administration). The receiver 24 preferably includes an internal antenna 28 therewith, but may also include provision for an external antenna 30 to be connected thereto, from the exterior of the housing 10.

The NOAA weather broadcast system uses several channels or frequencies in the 162 mHz range for providing weather information throughout the U.S., to provide line of sight reception capability for receivers tuned to the appropriate frequency or frequencies. Range is generally on the order of fifty miles, depending upon terrain. The appropriate channel or frequency for providing the best reception in a given area, is selected by means of a programming keypad 32, which may be integrated with the receiver 24 and housing 10. Alternatively, a remote external keypad 34 may be used, which communicates with the receiver 24 by means of rf, infrared, or other electromagnetic frequencies, ultrasonic frequencies, or a hard wired cable, may be used. The keypads 32 or 34 serve to select the desired receiving frequency, which is displayed on a programming display 36 (LED or light emitting diode, LCD or liquid crystal display, or other means for indicating the frequency or channel selected) visible at the housing 10.

The NOAA system uses a system called SAME (Specific Area Message Encoding), which encodes each broadcast to cover only a certain applicable area. Radio receivers which have been programmed to receive a different SAME code will not receive a given SAME code, even if those other receivers are within reception range of the broadcast. The programming codes are known as FIPS, or Federal Information Processing System, codes. The FIPS codes are generally ordered on a county wide basis within each state, but larger counties, or areas where relatively localized weather phenomena occur from time to time, can be broken down into smaller areas. The area covered by each specific FIPS coded broadcast, and the areas relevant to each specific FIPS code, are determined by NOAA.

Accordingly, the present combination smoke detector and severe weather warning device invention includes means for setting the FIPS code for the receiver 24, as by use of the programming keypad 32 or remote keypad 34 which is also used to select the appropriate frequency of the receiver 24. The FIPS code being entered is displayed in the programming display 36, just as the selected frequency which was entered, was displayed. It should be noted that this display, and any other display provided with the present invention, may be backlighted for legibility in darkness, if so desired, with electrical power for the display lighting being provided by the common power supply 16.

When a weather broadcast incorporating the selected FIPS code is received by the receiver 24, the message is output to appropriate means, depending upon the nature of the broadcast received. In the event of a severe weather warning (severe thunderstorms in the immediate area, tornado sightings in the immediate area, etc.) an alarm signal is broadcast before the actual voice weather message. A speaker 38 integrated within the housing 10 transmits this audible alarm to users of the present device. A volume control 40 and/or mute control may be incorporated for a user to adjust the volume as desired, depending upon the distance from the device and its speaker 38, and/or the need to provide only a visual alarm (e. g., the strobe alarm 42) for the device.

The receiver 24 may also incorporate a normally closed remote alarm relay 44, which is opened when a severe weather broadcast alarm is received. This relay 44 may be wired into an alarm system incorporated in the house or structure in which the present device is installed. Such alarm systems are generally activated only when a circuit is opened, as when a door is opened or a window is broken. By providing a normally closed remote alarm relay 44, which is only opened when a severe weather warning is received by the receiver 24, the severe weather warning may be used to activate the alarm system 46 of the house or structure, thereby providing further warning for persons therein. Such remotely located and/or external alarm systems 46 may incorporate either audible or visual alarm means (strobe lights, etc.), or both, as desired.

The NOAA severe weather radio system provides for more than only severe weather broadcasts. The system also provides for dissemination of weather watches (e. g., severe thunderstorms and/or tornadoes forecast for a given area, etc.) and general weather broadcasts for a given area, as well. Each of these different types of weather information (weather warnings, weather watches, and broadcast statements of the weather reported or forecast for the area) is accompanied by a specific signal, using the SAME technology. Accordingly, each specific signal may be used to activate a specific type of annunciator to alert a user as to the specific type of weather information being received. For example, a red light could be activated to indicate a severe weather warning broadcast being received, a yellow or amber light for a weather warning, and a green light for general weather information or statements. Such lights could be incorporated in a weather warning/weather watch/message alert area 48 of the housing 10.

In addition to the above general indicator means 48, more specific indications could be provided by means of an alphanumeric broadcast message display panel 50, if desired. Again, the specific signal broadcast over the NOAA weather broadcast system could be used to display a stored message (e. g., "THUNDERSTORM," "TORNADO,"

"FLASH FLOOD," etc.) on a message display panel 50. It will be noted that the message display panel 50 could be incorporated with the programming display panel 36 and used for message displays when the receiver is activated, if so desired.

In summary, the present combination smoke detector and severe weather warning device provides a much needed integration of warning devices for providing a warning for the two most common potential disasters to strike the average home or other building structure, i. e., fire and severe weather. The present combination device includes warning means for both smoke and/or fire, and severe weather, in a common, single, integrated package or housing, with all components using a common electrical power supply comprising existing electrical power supplied to the structure and an integral backup battery.

The present combination device is well suited for permanent installation in any structure where existing conventional smoke detectors are installed, and serves to provide the same warning in addition to providing timely warnings of severe weather. However, the present combination device is relatively compact and lightweight, and may be used as a portable warning device, if so desired. Many persons take along portable personal smoke detectors when traveling, in order to provide an alert in the event of fire in a hotel or motel in which they may be staying. The present combination device may also be used to provide such portable warning means, but its utility extends far beyond that of the conventional smoke detector. A user may have timely warning of area specific weather by means of the present combination device, merely by resetting the appropriate frequency and FIPS code for the area in which he or she is located.

Accordingly, the present combination device serves to provide great peace of mind for a person using the device, and the timely weather messages provided may serve to provide sufficient notice to a user of the device to prevent or reduce property damage due to severe weather, in addition to its potential life saving benefits. The combining of two devices providing warnings of potentially life threatening conditions into a single device, provides a much needed means of providing warning means for alerting persons of such conditions, without requiring the separate purchase and installation of two different and independent warning devices, as has been the case in the past. The cost savings of combining the two devices into a single housing using a common electrical power supply, as well as the savings of time in installing only a single device, will prove very attractive to the person requiring such warning devices in their residence and/or workplace, as well as other structures.

It is to be understood that the present invention is not limited to the sole embodiment described above, but encompasses any and all embodiments within the scope of the following claims.

We claim:

1. A combination smoke detector and severe weather warning device, comprising:

a housing mountable to a supporting surface;

means for detecting at least smoke, said detecting means being disposed within said housing;

means for receiving a severe weather radio broadcast from a remote source, said receiving means being disposed within said housing;

means for activating an alarm when smoke is detected and when severe weather broadcast is received by said receiving means, said alarm means being disposed within said housing;

said receiving means including:

means for selecting and setting Federal Information Processing System codes for a predetermined geographic region, and programming display means for displaying the selected Federal Information Processing System code; and an electrical power source for providing electrical power at least to said means for detecting at least smoke and said means for receiving the severe weather radio broadcast.

2. The combination smoke detector and severe weather warning device according to claim 1, wherein said electrical power source comprises an external electrical power supply and a backup battery power supply selectively operable when the external electrical power supply is interrupted.

3. The combination smoke detector and severe weather warning device according to claim 1, wherein said alarm means is selected from the group consisting of an audible alarm and an visual alarm.

4. The combination smoke detector and severe weather warning device according to claim 3, wherein said visual alarm comprises a strobe light.

5. The combination smoke detector and severe weather warning device according to claim 1, wherein said detecting means is selected from the group consisting of an ionized particle smoke detector and a heat sensing fire detector.

6. The combination smoke detector and severe weather warning device according to claim 1, including an antenna disposed external of said housing.

7. The combination smoke detector and severe weather warning device according to claim 1, including a remote keypad for communicating with said receiving means.

8. The combination smoke detector and severe weather warning device according to claim 1, wherein said programming display means is selected from the group consisting of light emitting diode and liquid crystal display means.

* * * * *